United States Patent [19]
Widecrantz et al.

[11] 3,970,415
[45] July 20, 1976

[54] ONE WAY VALVE PRESSURE PUMP TURBINE GENERATOR STATION

[76] Inventors: Kaj Widecrantz, P.O. Box 72; William R. Gatton, P.O. Box 222, both of Port Republic, N.J. 08241

[22] Filed: Apr. 10, 1975

[21] Appl. No.: 566,794

[52] U.S. Cl. ................................ 417/332; 60/496; 290/42
[51] Int. Cl.² .................... F04B 17/00; F04B 35/00
[58] Field of Search ................... 417/331, 332, 333; 60/496, 506; 290/42

[56] References Cited
UNITED STATES PATENTS

| | | | |
|---|---|---|---|
| 1,223,184 | 4/1917 | Larson | 417/332 |
| 2,935,024 | 5/1960 | Kofahl | 60/496 X |
| 3,126,830 | 3/1964 | Dillner | 417/331 |
| 3,603,804 | 9/1971 | Casey | 417/332 X |

FOREIGN PATENTS OR APPLICATIONS

| | | | |
|---|---|---|---|
| 562,217 | 8/1958 | Canada | 417/332 |

Primary Examiner—Carlton R. Croyle
Assistant Examiner—Richard E. Gluck
Attorney, Agent, or Firm—Richard L. Miller

[57] ABSTRACT

A new type of power generating plant that utilizes the motion of ocean waves to drive turbine generators in a power station; the plant including a series of underwater units each of which includes a hollow sphere that floats upon the water so that it rises and falls as waves move by, the ball being mounted on an end of a pivoting arm to which there is connected a piston slidable in a cylinder so to pump ocean water through a duct to the turbines in the power station.

2 Claims, 6 Drawing Figures

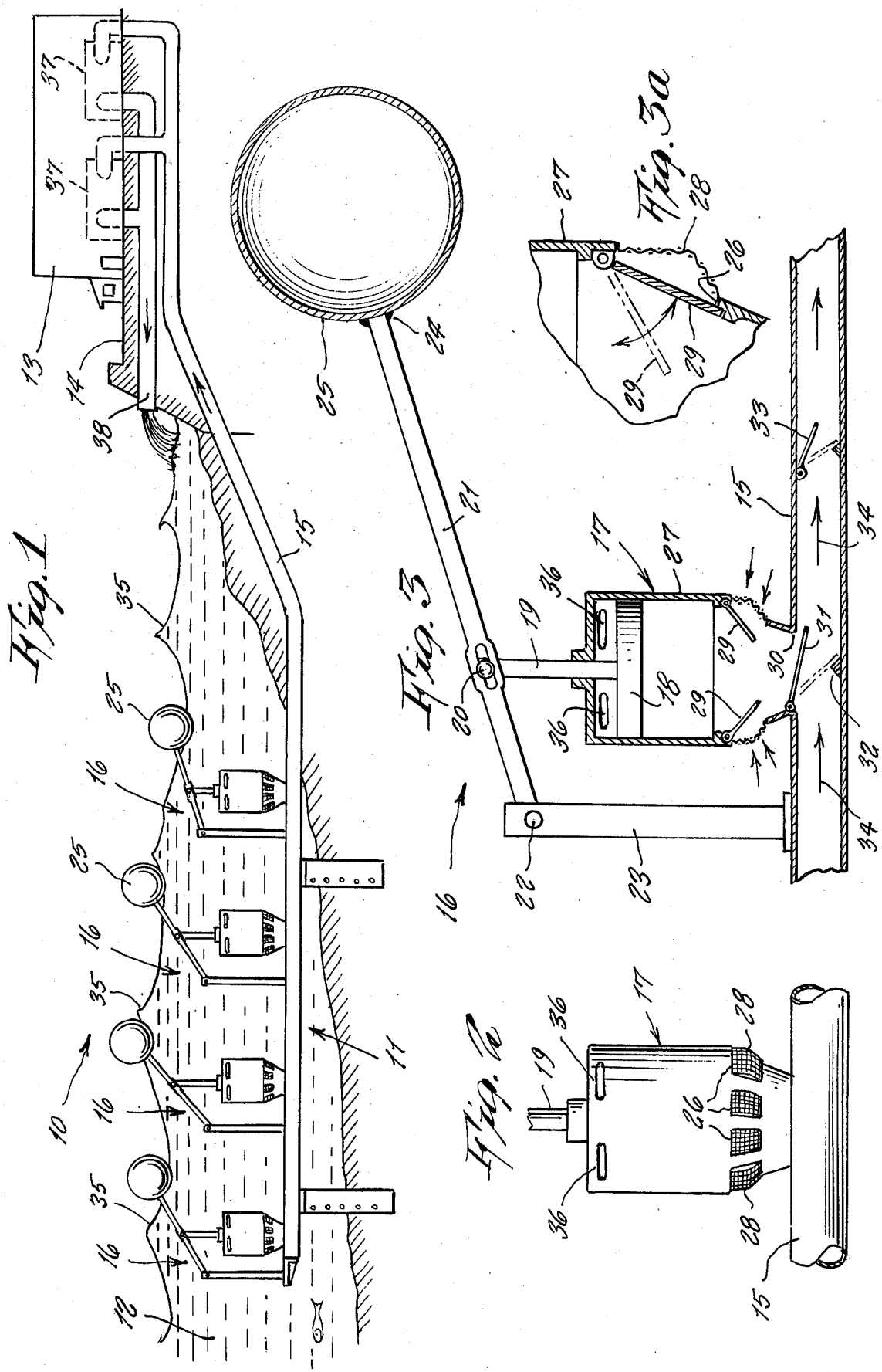

ONE WAY VALVE PRESSURE PUMP TURBINE GENERATOR STATION

This invention relates to power generating stations.

A principal object of the present invention is to provide a power generating station that utilizes the motion of ocean waves to drive power producing generators in the station, thus harnessing a free natural force that is endlessly abundant in great amount, thereby substituting the uses of fuels that cost money and most of which directly or indirectly contribute to pollution of the atmosphere while using up the limited amount thereof that exists.

Another object is to provide a turbine generator station that is located principally underwater so that it does not take up any valuable land space except for housing the generators, and which does not spoil the appearance of a landscape or seascape with large industrial structures, and which does not create noise pollution, and which requires a minimum personnel to keep operating.

Other objects are to provide a one way pressure pump turbine generator station which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a side view of the invention installed in a sea.

FIG. 2 is an enlarged side view of one of the water pumps.

FIG. 3 is a side cross sectional view of one of the pump units.

FIG. 3a is an enlarged detail of one of the flap valves of FIG. 3 shown in closed position.

Figure 4:
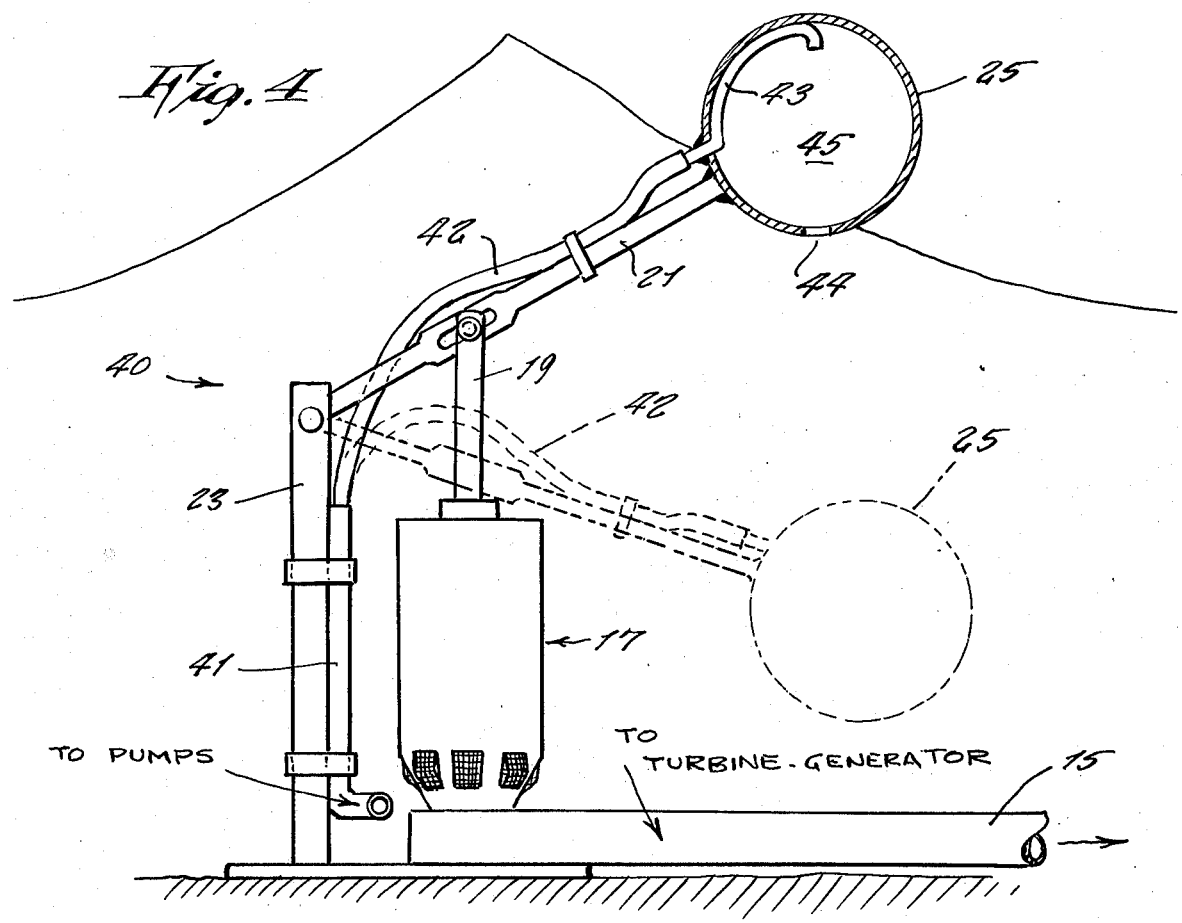
FIG. 4 is a side view of a modified design of pump unit which includes a shore controlled system so to either pump air in or out of the float ball, thus allowing it to be selectively submerged at times of heavy seas during a storm.

Referring now to the drawings in detail, and more particularly to FIGS. 1 through 3a at this time, the reference numeral 10 represents a one way valve pressure pump turbine generator system according to the present invention wherein there is an apparatus 11 that is installed underwater in a sea 12 and a power station 13 that is installed upon a land 14, and which is connected to the apparatus by a long duct 15 that runs from the land into the sea.

The apparatus 11 is comprised of a plurality of like units 16 each of which is connected to the duct, each unit including a large vertical cylinder 17 and piston 18 therein for pumping sea water from the sea into the duct 15. The piston rod 19 extending outward of an upper end of the cylinder is connected at its upper end by a pin 20 to an arm 21 which at one end pivots about a pivot pin 22 in the upper end of a stationary post 23, and at its other end the arm is rigidly affixed by a weld 24 or the like to a sealed, hollow, metal, spherical ball 25 filled with air that floats upon the water surface.

Near its lower end, the cylinder has a plurality of water entry ports 26 around its side wall 27, each port being covered on its outer side by a screen 28 so to prevent fish, seaweed or other foreign solids to enter the cylinder, and each port includes a flap valve 29 that pivots inwardly to open the port to, as shown best in FIG. 3a. An outlet port 30 in a bottom of the cylinder communicates with the duct 15 and includes a flap valve 31 that pivots downwardly to open the port. The flap valve 31 in its downwardly pivoted position abutts against a shoulder 32 secured around the inner side of the duct so that valve 31 thus becomes a one-way valve by preventing water pumped into the duct from flowing inside the duct into a direction that would be away from the station 13. Likewise, for the same purpose, intermediate one-way valves 33 are additionally located along the duct between the one-way valves 31. Thus all water in the duct flows in only the direction indicated by arrows 34 in FIGS. 1 and 3.

In operative use, it is now evident that as waves 35 roll along the water surface, they cause the balls 25 to rise and fall thus sliding the piston in the cylinder. During upstroke of the piston, the valves 29 are open to allow sea water to enter the cylinder, and valve 31 is pulled by low pressure inside the cylinder so to close the cylinder outlet port 30. During downstroke, the ports 26 are closed and port 30 is opened so the sea water in the cylinder is pushed into the duct.

Large ports 36 in the top of the cylinder allow sea water to circulate freely on top of the piston and prevent a sealed chamber being formed thereabove that would resist the free movement of the piston.

The power station contains turbine generators 37 to which the duct 15 delivers the sea water so the generators can produce electricity. An outlet duct 38 from the generators returns the spent water back to the sea.

In FIG. 4, a modified design of the invention shows a unit 40 in which the ball 25 can be selectively made to be lowered far underwater so that at time of storms it is not effected by the violence of turbulent giant waves and high winds above that might otherwise damage the unit. A system of pipes 41 extend from pumps located on shore, not shown in the drawing, to each of the units where the pipe 41 is connected to a flexible hose 42 secured alongside the arm 21 and which is connected to a nipple of a pipe 43 protruding into the interior and upper end of the ball 25. The lower end of the ball has a small opening 44 so that sea water can freely enter or leave the ball enterior chamber 45.

In operative use, when the pipes 41 are connected to a vacuum pump ashore, the air is pumped out of the balls so that sea water entering opening 44 fills the chamber thus causing the ball to sink to the position shown by dotted lines. After a storm is passed, the ball is refloated by the pipes being connected to an air pump ashore that pushes out any sea water that entered the pipe system and also pushes compressed air into the ball so to push the water out of the chamber through the opening 44. The compressed air inside the chamber prevents sea water to enter the chamber while the ball is in operating position even though the opening 44 is never closed.

Figure 5:
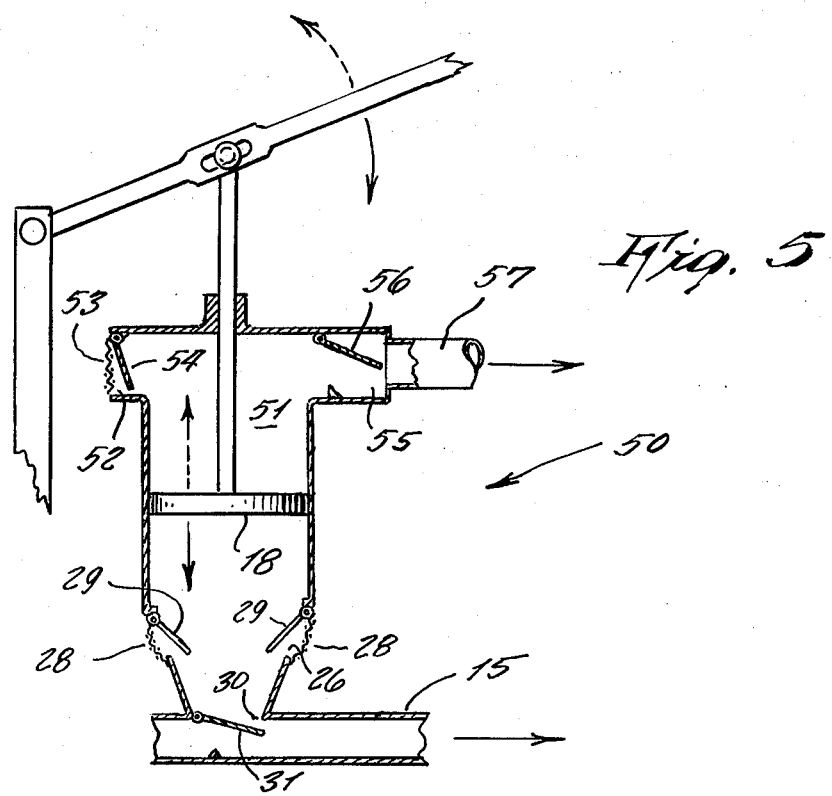
FIG. 5 is a side cross section of another design of water pump that harnesses the power of the waves when they raise the float as well as when they allow it to fall, thus greatly increasing the output power of the unit.

In FIG. 5, another modified design of the invention shows a cylinder 50 that produces approximately twice as much working effort as the above described cylinder because it harnesses the force of the upward movement of the piston as well as its downward movement. The lower portion of cylinder 50 below the piston is the same as above described cylinder 17 so to deliver sea water into duct 15. However, the upper portion of cylinder 50 is generally similar to the lower portion of the cylinder by including a cylinder chamber 51 having inlet port 52 covered by screen 53 and having one way flap valve 54, and it also includes an outlet port 55 fitted with one-way flap valve 56 so that sea water is delivered from the chamber 51 into a second duct 57 leading also to the turbine generators 58. Thus a downward stroke of the piston is a power stroke for the water entering duct 15, and the piston upward return stroke is a power stroke for water entering duct 57.

Thus different designs of the invention are provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a one way valve pressure pump turbine generator station assembly, the combination of an apparatus installed underwater in a sea, a power station ashore installed with turbine generators, and a duct between said apparatus and said generators, said apparatus comprising a plurality of units each of which consist of a cylinder having inlet ports for receiving sea water, an outlet port for delivering said sea water into said duct, a piston inside said cylinder, a piston rod of said piston being connected to an arm pivoted at one end about a pivot pin on a stationary post, an opposite end of said arm having a hollow ball filled with air for floating on a surface of said sea, wherein one way valves are installed at said inlet and outlet ports and along said duct, wherein an air line communicates between pumps upon a shore and an interior of said ball, and an opening in a lower end of said ball for said sea water entering or leaving said ball.

2. The combination as set forth in claim 1 wherein said cylinder includes an upper and lower chamber formed by said piston therebetween, said lower chamber having said inlet and outlet ports and said one way valves, while said upper chamber also has generally like inlet and outlet ports and one way valves, said upper chamber communicating with a second duct communicating with said turbine generators.

* * * * *